June 13, 1950 P. G. GLENKEY ET AL 2,511,404
COPPER BOTTOM ENAMELED COOKING RECEPTACLE
Filed Nov. 2, 1946
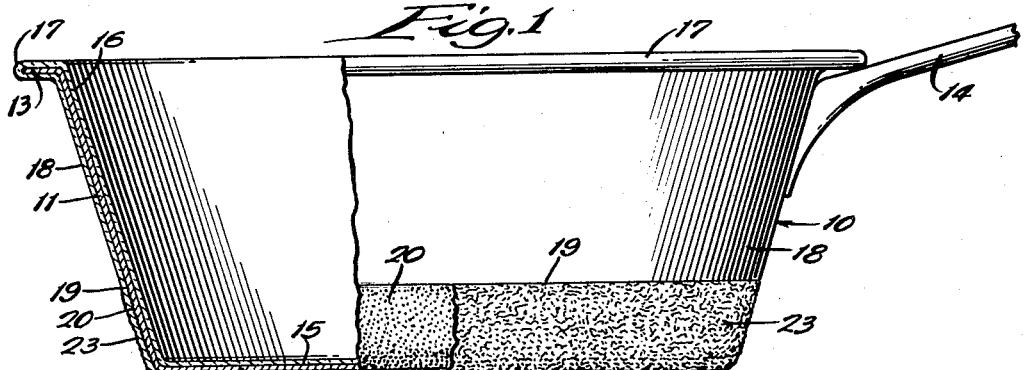
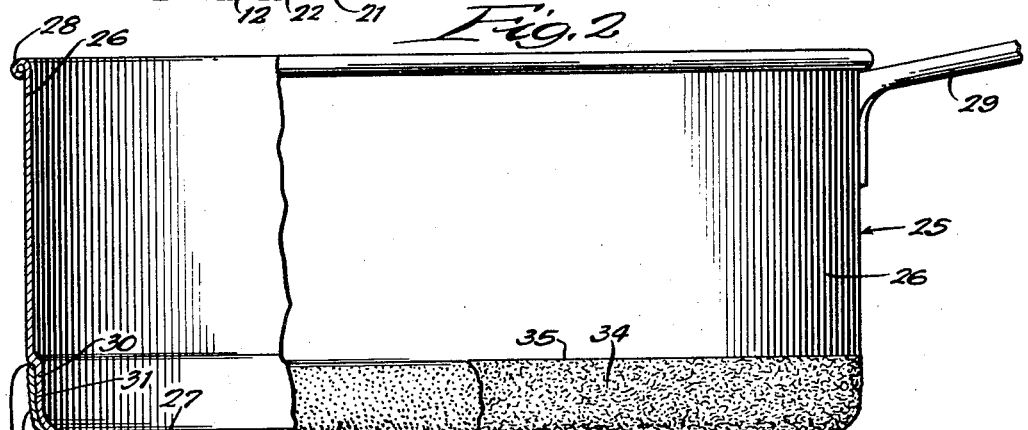
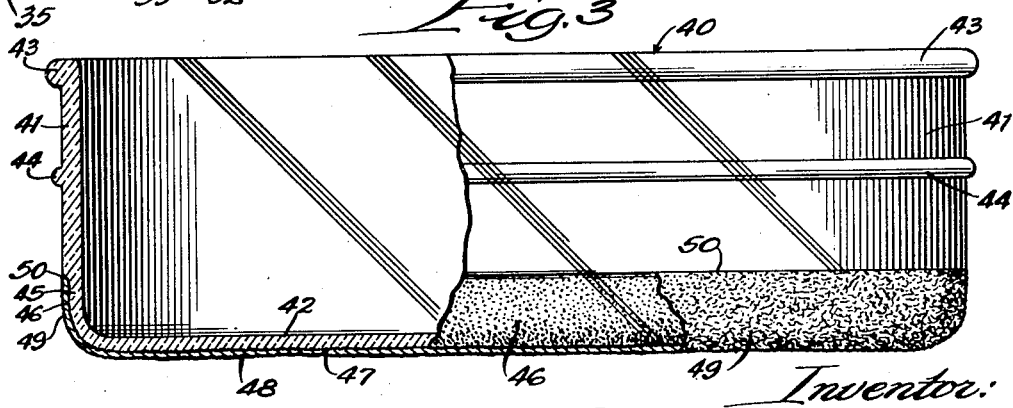
Inventor:
Paul G. Glenkey and
Harry H. Patrick,
By Dawson, Broth and Spangenberg,
Attorneys.

Patented June 13, 1950

2,511,404

UNITED STATES PATENT OFFICE

2,511,404

COPPER BOTTOM ENAMELED COOKING RECEPTACLE

Paul G. Glenkey and Harry H. Patrick, Chicago, Ill., assignors to Ade-O-Matic Company, Chicago, Ill.

Application November 2, 1946, Serial No. 707,430

2 Claims. (Cl. 126—390)

This invention relates to cooking receptacles provided with copper bottoms. Copper bottoms on cooking receptacles are known to increase and evenly distribute the heat transfer through the bottom of the receptacle to promote better cooking.

Prior to this invention copper bottoms have been applied to stainless steel cooking receptacles by an electroplating process. To obtain an even and uniform plating which is commercially satisfactory it has been necessary to rotate the receptacle rapidly in the plating bath over an extended period of time. The necessity of utilizing such complicated electroplating apparatus over such an extended period of time greatly adds to the cost of the ultimate product. The copper surface on the bottom of such a receptacle is smooth and shiny and accordingly lessens the heat transmitting properties thereof. Because of the rotation of the receptacle during the electroplating operation, only circular receptacles may be thus electroplated.

The application of copper bottoms to cooking utensils by such electroplating processes is limited to metal receptacles such as stainless steel and the like and is not applicable to other types of cooking receptacles such as glass receptacles, aluminum receptacles and enameled receptacles. Of course, copper cannot be successfully electroplated to glass or to aluminum nor can it be successfully electroplated to enameled receptacles for in the latter case the fumes from the electroplating bath deteriorate the enamel. If the receptacle is enameled after being electroplated, then the process of baking has a deteriorating effect on the copper surface.

The principal object of this invention is to provide an improved cooking receptacle wherein a layer of copper having a high heat transfer capacity, is sprayed on the bottom of the receptacle by a conventional copper spray gun. The copper particles impinging against the receptacle by the action of the spray gun adhere tenaciously to the receptacle and cannot be chipped therefrom. In this connection it is preferable to roughen the surface of the receptacle where the copper is to be received in order to increase the bond between the copper and the receptacle. By proper manipulation of the spray gun the copper may be evenly and uniformly applied to the receptacle.

The copper is thus applied to the bottom of the receptacle with simple equipment during a short interval of time whereby the completed receptacle may be manufactured at relatively low cost. The surface of the copper so applied is rought an relatively dull whereby the heat transferring capacity of the copper is at a maximum. Copper may thus be applied to non-circular receptacles such as oval, rectangular and square receptacles.

Another object of this invention is to provide an improved enamel cooking receptacle wherein a layer of copper having a relatively high heat transfer capacity is applied to the bottom thereof.

Still another object of this invention is to provide an improved enameled cooking receptacle wherein a layer of copper is sprayed on the bottom thereof.

A further object of this invention is to provide, by spraying, a layer of copper on a portion of the side wall of the receptacle adjacent the bottom and to make such layer substantially flush with the remainder of the side wall.

Other objects and advantages will become apparent to those skilled in the art upon reference to the accompanying specification, claims and drawing, in which—

Fig. 1 is a side elevational view partly in section showing the improved enameled cooking receptacle;

Fig. 2 is a side elevational view partly in section showing the improved stainless steel cooking receptacle; and Fig. 3 is a side elevational view partly in section showing the improved glass cooking receptacle.

Referring first to Fig. 1, the improved enameled cooking receptacle is generally designated at 10 and includes a metallic receptacle member made from iron, steel, aluminum or other metals and having a side wall 11 and a bottom wall 12. If desired, the side wall 11, at its upper extremity, may be provided with a flange 13. A suitable handle 14 may be secured to the side wall 11 of the receptacle. The interior surfaces of the bottom wall 12 and the side wall 11 are provided with enamel as at 15 and 16 and in a case where the receptacle includes the flange 13, enamel covers the flange as at 17. The enamel also extends downwardly as at 18 over the exterior surface of the side wall 11 to a circumferential line of demarcation 19. The exterior surface of the side wall between the line of demarcation 19 and the bottom wall is roughened as at 20 and the bottom wall is likewise roughened as at 21. This roughing action may be obtained by pickling, sand blasting, or in any other suitable manner.

A layer of copper 22, having a high heat transfer capacity, is sprayed on the roughened surface 21 of the bottom wall 12 and in the same operation a contiguous layer of copper 23 is sprayed on the roughened surface 20 of the side wall 11. The thickness of the copper layer 23 on the side wall 11 is substantially the same as that of the enamel 18 on the side wall so that where the copper layer 23 abuts the enamel 18 at the line of demarcation 19, the exterior surfaces of the enamel 18 and the copper layer 23 are substantially flush, thereby providing a neat appearance.

In the formation of the cooking utensil of Fig. 1, the metallic receptacle member is cleaned and the enamel applied and baked. The exteriors of the bottom wall and the side wall adjacent the bottom wall are then roughened and the layer of copper is sprayed on the roughened surfaces by a conventional copper spray gun. As the particles of copper from the copper spray gun impinge upon the roughened surfaces they adhere tenaciously thereto and thus, in a short time, the copper layer is built up to the desired thickness. By proper manipulation of the copper spray gun the layer of copper applied to the receptacle may be made even and uniform.

By applying the copper bottom to the enameled receptacle of Fig. 1 as above described, the enamel is in no way affected by heat or fumes as would be in the case where an attempt would be made to electroplate copper thereon. The layer of copper 22, 23, having a high heat transfer capacity, operates to increase the transmission of heat through the receptacle and at the same time to distribute evenly the heat transmission. Local hot spots on the inner surface of the enameled pan are, therefore, entirely eliminated so that cracking of the enamel by heat is entirely prevented. Since the layer of copper extends over the bottom corner of the receptacle and partially up the side wall thereof, chipping of the enamel at the corner of the receptacle, as usually occurs in conventional enameled cooking receptacles is also entirely eliminated.

The exterior surface of the layer of copper thus applied to the receptacle is relatively rough and dull whereby heat passes readily therethrough without substantial reflection as would be the case where the exterior surface is smooth and shiny.

Because the bond between the receptacle and the layer of copper is formed on the roughened surface, the transmission of heat through the bond is maintained at a maximum. There are no shiny and smooth surfaces at the bond which would act to reflect the transmitted heat.

In Fig. 2 the improved stainless steel cooking receptacle is generally designated at 25 and includes a side wall 26 and a bottom wall 27. The upper extremity of the side wall 26 may be provided with a suitable flange or edge 28. A handle 29 may be suitably secured to the side wall 26. The side wall 26 adjacent the bottom wall is preferably provided with an annular recess in the exterior surface thereof which may be formed by indenting the receptacle at 30 by suitable dies. The exterior surfaces of the annular recess 30 and the bottom wall 27 may be roughened in any suitable manner, as indicated at 31 and 32. A layer of copper is sprayed on the roughened surface 32 of the bottom wall 27 and on the roughened surface 31 of the annular recess 30 in the same manner as pointed out above in connection with Fig. 1. The layer of copper 34 in the annular depression 31 extends upwardly to a line of demarcation 35 formed by the end of the annular depression and the exterior surfaces of the layer of copper and the side wall of the cooking receptacle are substantially flush. If desired, aluminum or other metals may be utilized in lieu of stainless steel.

The advantages pointed out above in connection with Fig. 1 with respect to the simplicity of application of the copper layer and the heat transmission characteristics thereof are also present in the improved stainless steel cooking receptacle of Fig. 2.

In Fig. 3 the improved glass cooking receptacle is generally designated at 40 and it includes a side wall 41 and a bottom wall 42. The upper extremity of the side wall may be provided with a suitable edge 43 and, if desired, may be provided with ornamental ribs 44. In the formation of the glass receptacle, an annular depression 45 is provided in the side wall of the receptacle adjacent the bottom wall. The exterior surface of the annular depression 45 is roughened at 46 and likewise the exterior surface of the bottom wall 42 is roughened at 47. The roughening of the exterior surfaces may be accomplished by sandblasting or other suitable methods.

A layer of copper 48 is sprayed on the roughened surface 47 of the bottom surface 42 and the layer of copper extends around at 49 over the roughened surface 46 of the annular depression 45. The manner of application of the copper layer to the glass utensil of Fig. 3 is precisely the same as that of the utensils of Figs. 1 and 2.

The copper layer 49 on the side wall extends upwardly to the line of demarcation 50 and because of the annular recess 45 the exterior surfaces of the copper layer 49 and the side wall 41 are substantially flush.

The advantages of the copper bottom of Figs. 1 and 2, especially as to simplicity of application and heat transfer characteristics, apply equally well to the glass cooking receptacle of Fig. 3.

While for purposes of illustration several forms of this invention have been disclosed, other forms thereof may become apparent to those skilled in the art upon reference to this disclosure, and, therefore, this invention is to be limited only by the scope of the appended claims.

We claim as our invention:

1. An enameled cooking receptacle comprising metal bottom and side walls with the interior of the receptacle and the upper portion of the exterior of the side wall continuously enameled to a circumferential line of demarcation on the exterior of the side wall and with the exteriors of the bottom wall and the lower portion of the side wall below the line of demarcation roughened, and a layer of copper sprayed on and adhering to the roughened surfaces of the receptacle and terminating flush with the enameled surface at the line of demarcation.

2. An enameled cooking receptacle comprising metal bottom and side walls with the interior of the receptacle and the upper portion of the exterior of the side wall provided with a continuous layer of enamel to a circumferential line of demarcation on the exterior of the side wall and with the exteriors of the bottom wall and the lower portion of the side wall below the line of demarcation provided with a continuous layer of copper terminating flush with the enameled surface at the line of demarcation.

PAUL G. GLENKEY.
HARRY H. PATRICK.

REFERENCES CITED

The following references are of record in the file of this patent:

UNITED STATES PATENTS

| Number | Name | Date |
|---|---|---|
| 69,001 | Ligon | Sept. 17, 1867 |
| 708,363 | Ketcham | Sept. 2, 1902 |
| 1,447,180 | Ployer | Mar. 6, 1923 |
| 2,053,923 | Stewart | Sept. 8, 1936 |
| 2,057,254 | Sommer | Oct. 13, 1936 |
| 2,272,609 | Kennedy et al. | Feb. 10, 1942 |
| 2,320,327 | Meduna | May 25, 1943 |
| 2,390,805 | Merryman et al. | Dec. 11, 1945 |

FOREIGN PATENTS

| Number | Country | Date |
|---|---|---|
| 436,229 | Great Britain | Oct. 7, 1935 |
| 567,388 | Germany | Jan. 2, 1933 |